R. S. WHITE.
METER TEST BLOCK.
APPLICATION FILED MAY 8, 1915.

1,206,394.

Patented Nov. 28, 1916.
2 SHEETS—SHEET 1.

Inventor
R. S. White
By Watson & Bayley
Attorneys

R. S. WHITE.
METER TEST BLOCK.
APPLICATION FILED MAY 8, 1915.

1,206,394.

Patented Nov. 28, 1916.
2 SHEETS—SHEET 2.

Inventor
R. S. White
By Watson Boyden
Attorneys

UNITED STATES PATENT OFFICE.

ROGER S. WHITE, OF WASHINGTON, DISTRICT OF COLUMBIA.

METER TEST-BLOCK.

1,206,394.  Specification of Letters Patent.  Patented Nov. 28, 1916.

Application filed May 8, 1915. Serial No. 26,711.

*To all whom it may concern:*

Be it known that I, ROGER S. WHITE, a citizen of the United States, residing at Washington, in the District of Columbia, have invented certain new and useful Improvements in Meter Test-Blocks, of which the following is a specification.

This invention relates to test blocks for electric meters, and is designed and adapted particularly for use in connection with meters in circuits where comparatively large quantities of current are carried. In such installations the conducting wires or cables are of large cross section and are usually provided with terminal pieces soldered or otherwise permanently secured thereto, for convenience in attaching the wires to the test block, and if these terminal pieces have to be clamped and unclamped for the purpose of making meter tests, trouble frequently arises in securing good contact with the parts, owing to the difficulty of bending the wires or cables. For this reason the terminals are usually connected to other fixed parts secured to the base, and additional connecting devices are provided for making the circuit changes on the base. By means of my improvements, the circuit connections are made upon the terminal pieces themselves, and these are loosely mounted, to rock in two directions, so that in making the changes the parts are never put under strain and an ample contact area is assured between co-engaging parts. Thus, a minimum number of parts are required and unnecessary heating is prevented. In this invention the several terminal pieces are pivotally mounted, and are supported away from the base, in order to permit the air currents to flow entirely around the conducting members and carry off the heat.

Figure 1:
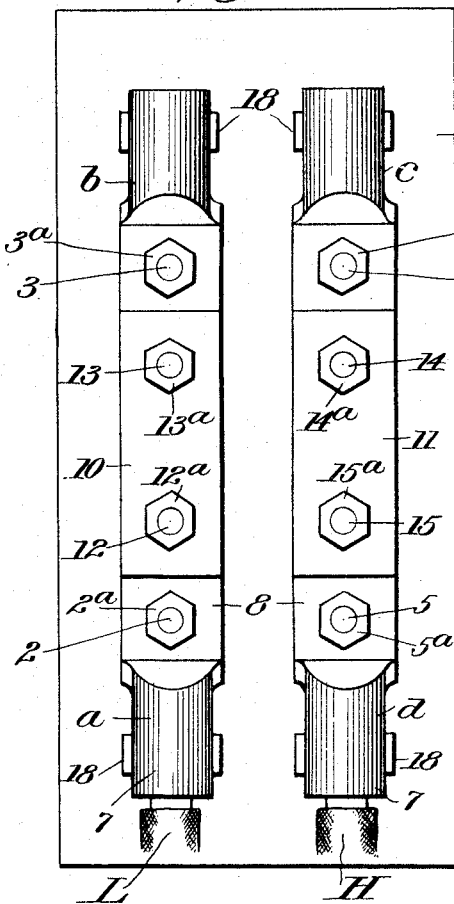
Figure 2:
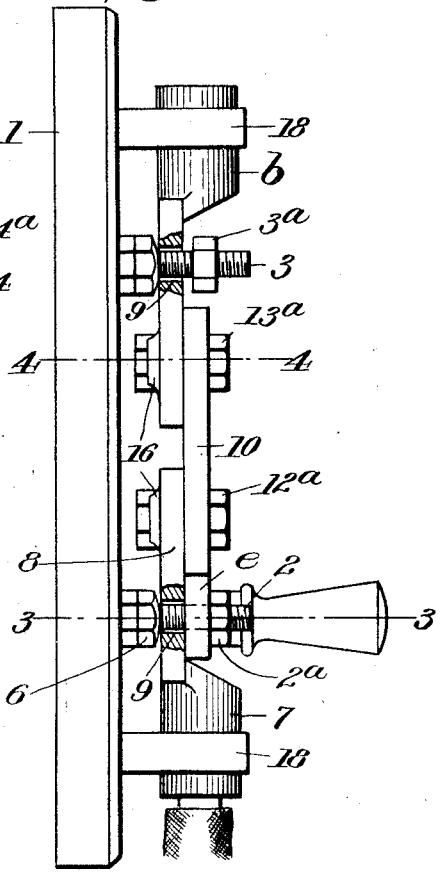
Figure 3:
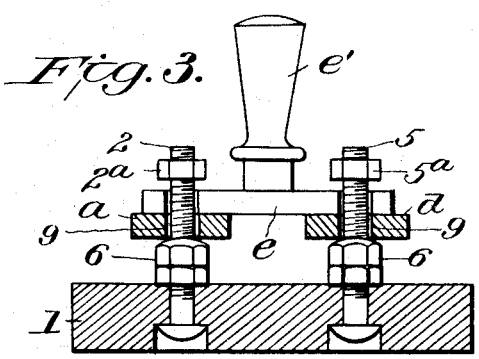
Figure 4:
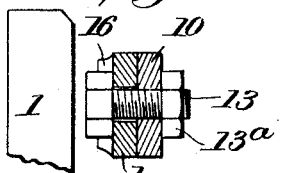
Figure 5:
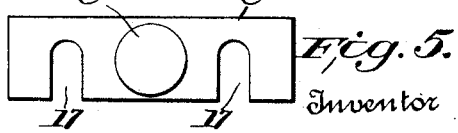

In the accompanying drawing, which illustrates my invention, Figure 1 is a plan view of the test block, with the parts in normal positions; Fig. 2 is a side view of the same, partly in section, the short circuiting bar being shown in position for bridging the meter fields; Fig. 3 is a section on the line 3—3 of Fig. 2; Fig. 4 is a section on the line 4—4 of Fig. 2; Fig. 5 is a plan view of the short circuiting bar; and Figs. 6 to 9, inclusive, are diagrammatic views illustrating successive steps in the operation of changing the circuit connections to connect in the test meter.

Referring to the drawing, in which the invention is shown as adapted for two-wire service, 1 indicates a suitable base, of insulating material, from which project four threaded studs 2, 3, 4, and 5. These studs, as shown in Fig. 3, extend through suitable openings in the base and are secured by lock nuts 6. These locks nuts form shoulders for supporting the various conducting parts away from the base. Upon these studs are mounted the four terminal pieces $a$, $b$, $c$, $d$, which are alike in construction, each comprising a hollow cylindrical part 7, for receiving the end of a conducting wire or cable, and a flat part 8, of suitable length and width which affords an ample contact surface for engagement with other parts having flat contact surfaces adapted to rest thereon. The several terminals have openings 9, extending through their flattened portions, and they rest upon the shoulders 6 with the studs projecting through said openings, as shown in the drawings. These openings are large enough in diameter to permit of slight rocking movement of the terminals on the shoulders 6. Considering the terminal $a$ to be connected to one of the supply wires L and the terminal $d$ to be connected to a house or service wire H, and the terminals $b$ and $c$ to be the meter field terminals, the supply terminal $a$ is normally connected to the meter field terminal $b$ by a flat connecting bar 10, and the house terminal $d$ is normally connected to the meter field terminal $c$ by a similar flat connecting bar 11. These bars rest upon the flat contact surfaces of the terminals and are securely clamped thereagainst by clamping bolts 12, 13, 14, and 15, secured by nuts $12^a$, $13^a$, $14^a$, and $15^a$. The under sides of the parts 8 of the terminals, as shown, are provided with projections 16, which lock the heads of the bolts against turning.

For the purpose of short-circuiting the meter fields, a flat short-circuiting bar $e$ is provided, this bar being of sufficient length to bridge the terminals $a$ and $d$, and of a width adapted to permit the bar to fit between the ends of the connecting bars 10 and 11 and the parts 7 of the terminals $a$ and $d$. The short-circuiting bar is provided with slots 17, entering from one side, to receive the studs 2 and 5 so that said bar may be positioned beneath the nuts $2^a$ and $5^a$ on said studs. By tightening these nuts, the short-circuiting bar may be secured firmly against the contact faces of the terminals. For convenience in handling the short-circuiting bar, it is provided with a handle $e'$, of insulating material.

For the purpose of holding the terminals $a$ and $b$ in line with one another, when the connecting bar 10 is removed, yokes 18 are provided, these being suitably secured to the base, and having their arms projecting up at the sides of the cylindrical ends of the terminal pieces. The terminals $c$ and $d$ are held in substantial alinement by similar yokes, as shown.

As the conducting parts are held away from the base, the air may flow freely around them and carry away the heat. The nuts $3^a$ and $4^a$ have no clamping function to perform, and the same is true of the nuts $2^a$ and $5^a$ when the parts are connected up for normal operation. The latter nuts are only used for clamping purposes when the short-circuiting bar is applied, and at other times the nuts upon the studs are only useful to keep the parts assembled upon the block when the latter is being transported or handled. Each terminal may rock endwise as well as sidewise when not secured by one of the connecting devices to another terminal, and naturally, when the connecting devices are removed, the heavy wires or cables secured to the terminal pieces will rock the latter so that their contact surfaces will be in different planes. If, now, the connecting pieces 10 and 11 are placed upon the contact surfaces of the terminals $a$—$b$ and $c$—$d$, and bolted thereto, each connecting piece will line up the contact surfaces of the two terminals which it connects and make good contact therewith. This will be done without putting any stress or strain upon the studs which support the members because a limited rocking movement of the terminal pieces is provided for. Owing to the fact that the terminal pieces may rock laterally as well as longitudinally, good contact surfaces are assured between the short-circuiting bar and the terminal pieces $a$ and $d$ when said bar is placed upon the flattened surfaces of said pieces and the nuts $2^a$ and $5^a$ are tightened. Thus, it will be evident that whenever one of the connecting bars or a short-circuiting bar is secured in position, a good flat contact surface will be assured because the terminal pieces may rock about their pivotal points in two directions.

Figure 6:
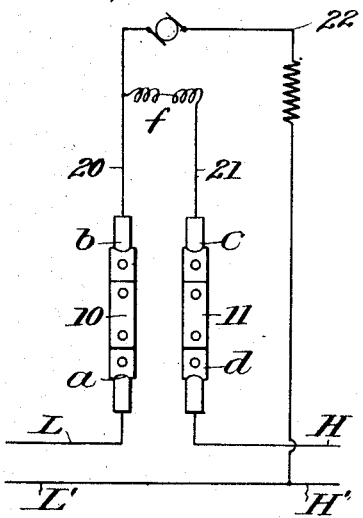

Fig. 6 illustrates the normal connections of the parts, L indicating one line wire extending to the terminal piece $a$, and L' indicating the other line wire which connects directly with one of the house wires H', the other house wire H connecting with the terminal $d$. The meter fields $f$ are shown connected by wires 20 and 21 to the meter field terminals $b$ and $c$, the armature circuit of the meter is indicated at 22, connected from the wire 20 to the supply wire L'.

Figure 7:
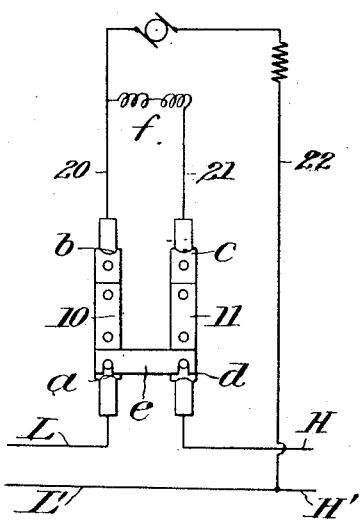

In Fig. 7, the short-circuiting bar $e$ is shown applied to the terminals $a$ and $d$, thus bridging the meter fields, this being the first step in changing the circuits for applying the test meter.

Figure 8:
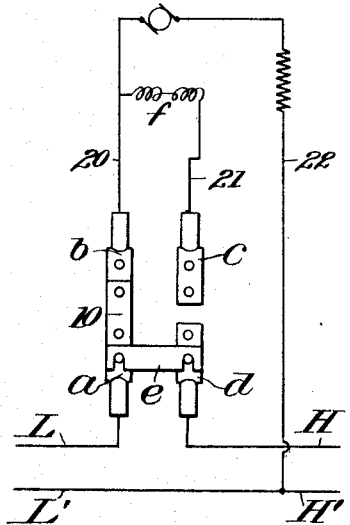

As shown in Fig. 8, the next step is the removal of the connecting bar 11, which disconnects one side of the meter fields.

Figure 9:
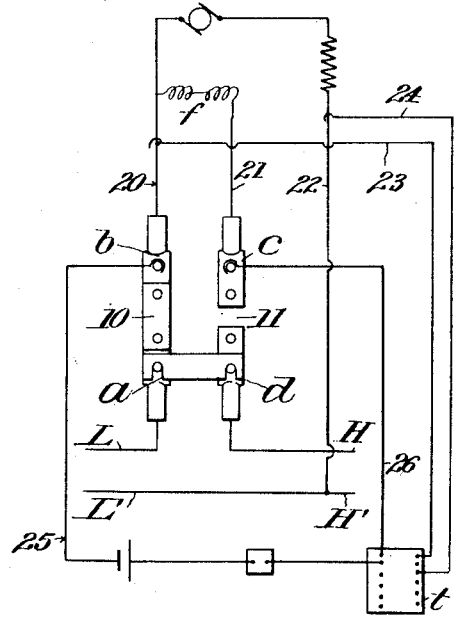

The next step is illustrated in Fig. 9, the test meter $t$ being shown with its potential wires 23 and 24 connected in the usual way across the terminals of the meter armature and its field wires connected by conductors 25 and 26 in series with the fields $f$ of the house meter. By reversing the steps shown in the drawing, the connections will be restored to their original and normal arrangement as shown in Fig. 6.

What I claim is:

1. In a meter test block, a suitable base, supply, house and meter field terminals mounted thereon and each adapted to rock laterally and longitudinally, bars detachably connecting the meter field terminals with the supply and house terminals, respectively, and a bar adapted to connect the supply and house terminals.

2. In a meter test block, a suitable base, supply, house and meter field terminals each fulcrumed thereon and each adapted to rock in two directions, said terminals having flat contact surfaces, bars having similar surfaces connecting the meter field terminals with the supply and house terminals respectively, and a bar having a flat surface adapted to engage the contact surfaces of the supply and house terminals.

3. In a meter test block, a suitable base, supply, house and meter field terminals, devices projecting from the base and each loosely supporting a terminal away from the base, each terminal having a wire attaching portion and a flat contact portion, bars, having flat surfaces, connecting the contact portions of the meter field terminals with the like portions of the house and supply terminals, means for clamping said bars to said terminals, a bar having a flat surface adapted to engage the contact surfaces of the house and supply terminals, and means for clamping said latter bar against said latter terminals.

In testimony whereof I have affixed my signature.

ROGER S. WHITE.